United States Patent
Young

[11] 3,880,019
[45] Apr. 29, 1975

[54] SAW SHARPENER APPARATUS
[76] Inventor: Melburne E. Young, Rt. 2, Pierz, Minn. 56364
[22] Filed: June 27, 1974
[21] Appl. No.: 483,805

[52] U.S. Cl. .................................. 76/37; 76/41
[51] Int. Cl. ........................................ B23d 63/14
[58] Field of Search .................... 76/37, 41, 46–48

[56] References Cited
UNITED STATES PATENTS

| | | | |
|---|---|---|---|
| 1,456,402 | 5/1923 | Ramsey | 76/37 |
| 2,249,743 | 7/1941 | Bucknam | 76/37 |
| 2,638,018 | 5/1953 | Davis et al. | 76/37 |

Primary Examiner—Leonidas Vlachos
Attorney, Agent, or Firm—Dugger, Johnson & Westman

[57] ABSTRACT

Apparatus for sharpening saw blades when being supportingly mounted on the blade, an elongated beam, a clamp mounted at each end portion of the beam for clampingly engaging the blade to mount the beam on the blade, a carriage mounted for slidable movement along the beam, stop members on the beam to limit the movement of the carriage in each direction along the length of the beam, lever mechanism for moving the carriage in a direction for sharpening the blade, a spring for resiliently moving the carriage away from a blade sharpening position, a motor driven grinding wheel, disk mechanism for mounting the motor on the carriage and permitting adjustment of the motor relative the carriage for both angle and pitch of the grinding wheel relative the blade, and a guard for the grinding wheel adjustably mounted on the carriage. The stop member, clamp members and the lever mechanism are slidable mounted on the beam and include set screws for retaining them in selected adjusted positions on the beam.

15 Claims, 5 Drawing Figures

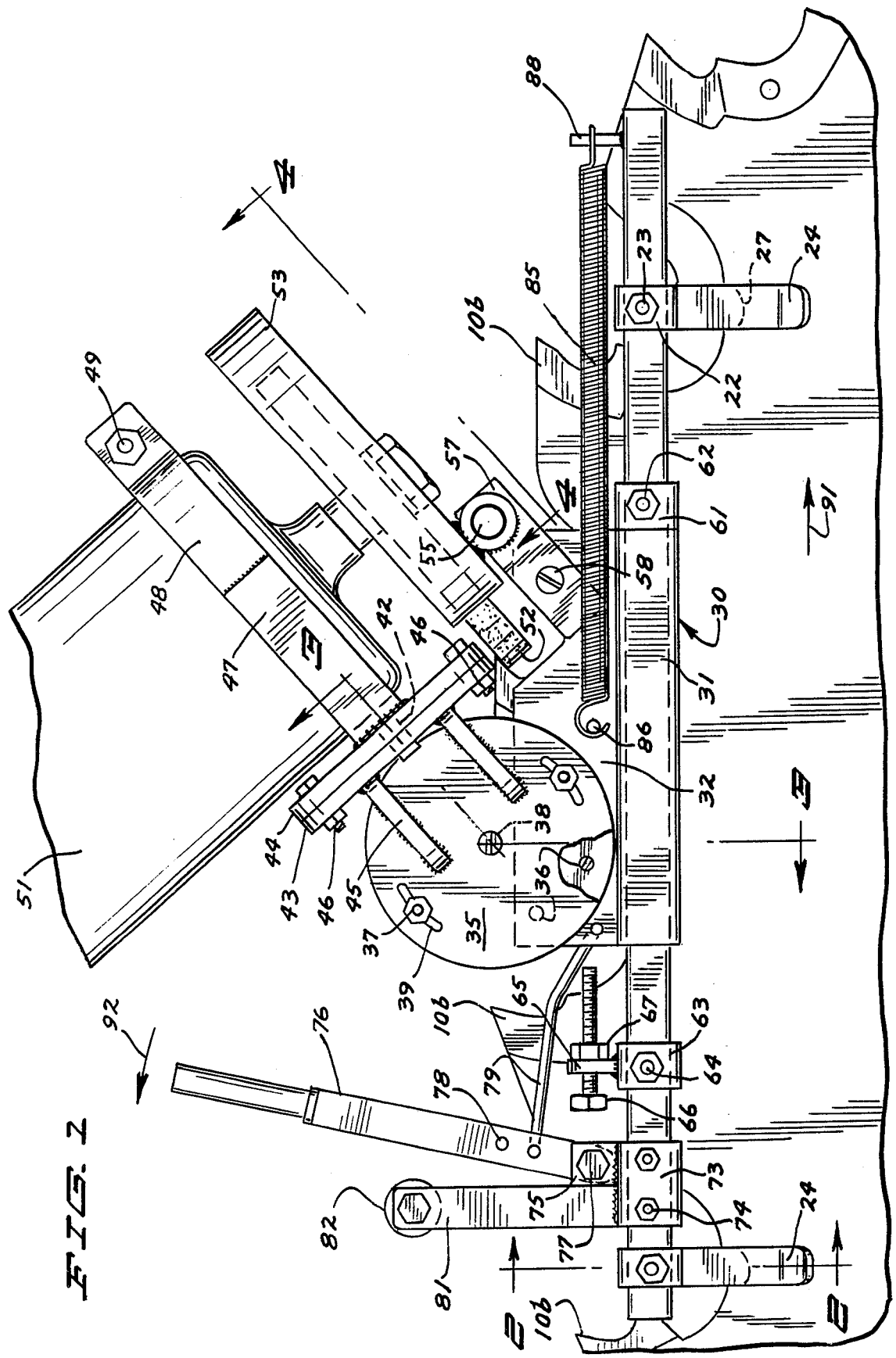

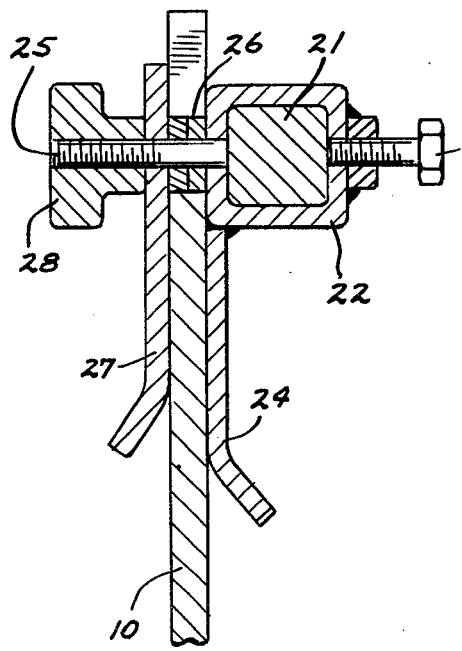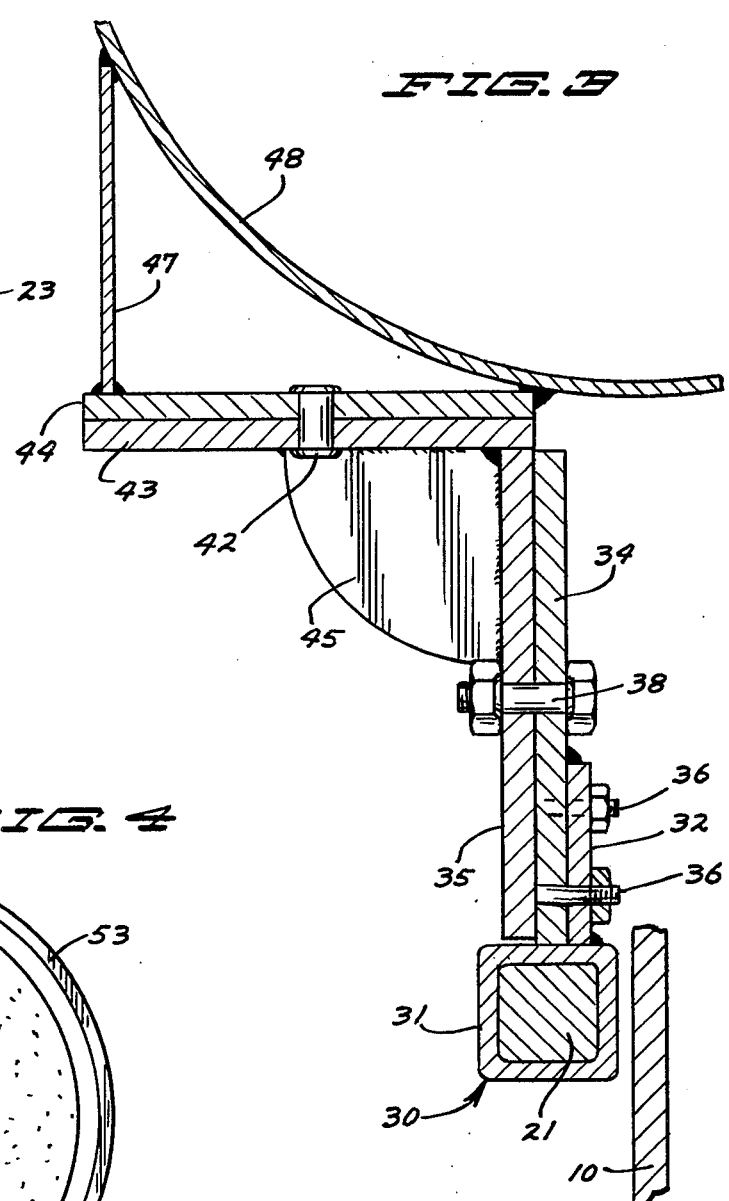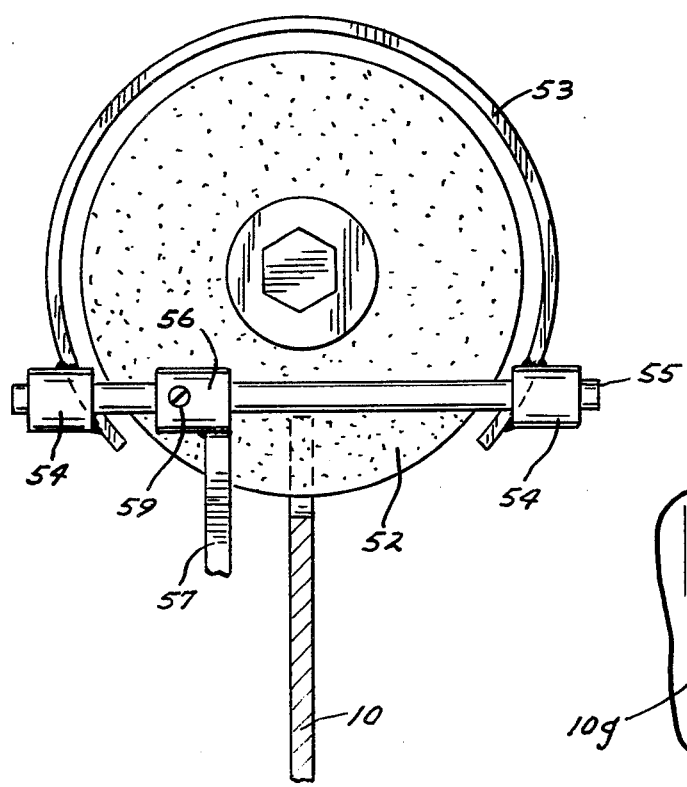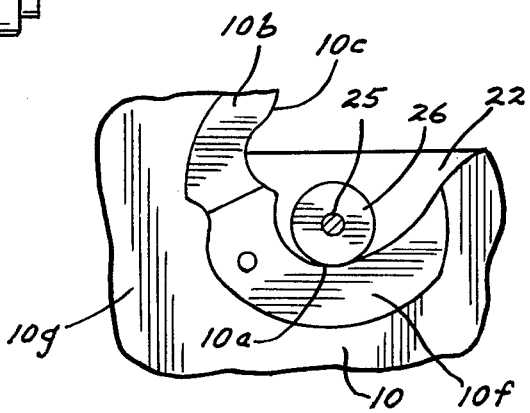

3,880,019

SAW SHARPENER APPARATUS

BACKGROUND OF THE INVENTION

This invention relates to a motor driven saw sharpner that is mounted on a saw blade to be supported by said blade.

In U.S. Pat. No. 2,709,378 to Risor and U.S. Pat. No. 2,439,279 to Andrus there is disclosed a saw sharpner that is clampable on a disk saw. However, neither of these saw sharpners is as of simple instruction and as readily removable from one clamped position to sharpen one tooth to a second clamped position to sharpend a second tooth as desirable. Also, in moving from one position to another, readjustments have to be made relatively frequently. In order to minimize problems such as the above, as well as to provide a saw sharpner that may be readily used with different size saw blades, this invention has been made.

SUMMARY OF THE INVENTION

A saw blade sharpner that is mountable on a saw blade that includes an elongated beam having spaced clamps mounted thereon, a carriage mounted on the beam between the clamps for slidable movement, manually operated mechanism for moving the carriage on the beam, and a motor mount mounted on the carriage for mounting a motor driven grinding wheel and permitting limited adjustment for the grinding angles of the wheel relative the blade.

BRIEF DESCRIPTION OF DRAWINGS

FIG. 1 is a side view of the saw sharpner apparatus of this invention clamped on a mill saw blade, a portion of the motor being broken away;

FIG. 2 is a transverse cross sectional view that is taken along the line and in the direction of the arrows 2—2 of FIG. 1 to more clearly illustrate the mechanism for clamping the apparatus of this invention to the mill saw blade;

FIG. 3 is a fragmentary cross sectional view, generally taken along the line and in the direction of the arrows 3—3 of FIG. 1 to illustrate the carriage mechanism of this invention;

FIG. 4 is a fragmentary view generally taken along the line and in the direction of the arrows 4—4 of FIG. 1 to more clearly illustrate the grinding wheel, the grinding wheel guard and the mounting thereof relative the saw blade; and FIG. 5 is a fragmentary side view of a portion of the saw blade to more clearly illustrate a bit thereof that is to be sharpened and part of the structure that mounts the beam on the blade.

Even though the apparatus of this invention is useful for sharpening other types of saw blades, it is particularly useful for sharpening circular mill saw blades 10 that include conventional retainer members 10f and bits 10b around the periphery of the blade member 10g.

Referring now in particular to FIGS. 1 and 2, the apparatus of this invention includes an elongated slide beam 21 that in transverse cross section is illustrated as being rectangular. However, the beam may be other cross sectional shapes. At each end of the beam there is provided a rectangular clamp collar 22 that is slidably mounted on the beam and provided with a boss that threadly mounts a set screw or bolt 23 for being threaded against the beam to prevent the collar moving relative the beam. On the opposite side of the collar from the set screw, there is provided a depending clamp leg 24 that in conjunction with said opposite side of the collar is abutable with one side of the saw blade 10. Secured to the side of the collar that is abutable against the beam is a stud 25 that extends outwardly and through annular spacers 26 and an aperture in leg 27, and has a nut 28 threaded thereon. An appropriate number of spacers are provided on the stud 25 to space the upper end of the clamp leg 27 from the collar 22 substantially the same distance as the thickness dimension of the blade to be sharpened. A nut 28 is threaded on the stud 25 for retaining the clamp leg 27 in clamping engagement with the opposite surface of the blade 10 from the clamp leg 24. Advantageously the lower ends of the clamp legs are curved to diverge outwardly from blade for the purpose of facilitating the mounting of the apparatus of this invention on the blade. In connection with above it is to be noted that the spacers 26 on stud 25 are provided to supportingly bear against the radially innermost part 10a of a tooth recess of a saw blade.

Slidably mounted on the beam immediate the collars 22 is a carriage, generally designated 30. The carriage includes an elongated tubular slide member 31, the transverse cross section of which is of a shape to prevent the carriage pivoting about the axis of elongation of the beam. A plate 32 is mounted to the tubular member to extend upwardly thereof. A disk 34 is mounted on the plate 32 to extend upwardly thereof by having a pair of spaced studs 36 secured thereto and extended through apertures in the place 32 and nuts threaded on said studs to retain the disk 34 in a fixed position relative the plate 32. A pivot member 38 mounts a disk 35 on disk 34 on the opposite side therefrom plate 32 for pivotable movement relative thereto with the axially adjacent surfaces of the disks in abutting relationship. The disk 35 is provided with diametrically opposed arcuately elongated slots 39 having bolts 37 extended therethrough and through apertures (not shown) in disk 34. Preferrably the apertures of disk 34 are of a circular shape to prevent any angular movement of the bolts 37 relative the disk 34 while the slots 39 are of accurate lengths to permit substantial angular movement of the disk 35 relative the disk 34; nuts being threaded on the bolts 37 for retaining the disk 35 in a selected angularly adjusted position relative the disk 34.

Also provided are disks 43 and 44 which advantageously are of the same construction as disks 34 and 35, respectively and connected to one another in the same manner. That is, disks 43 and 44 are connected together by a pivot member 42 and have bolts 46 extended through arcuately elongated slots (not shown) in disk 44 and circular apertures in disk 43, nuts being threaded on bolts 46 for retaining the disk 44 in selected adjusted angular positions relative the disk 43. One edge portion of disk 43 is welded to an edge of disk 35 whereby the adjacent axial surfaces of disks 43, 35 extend substantially at right angles to one another, disk 43 extending outwardly from disk 35 in a direction away from disk 34. Brackets 45 are welded to disks 35, 43 to serve as reenforcing members. To be noted is that the pivot axis of pivot member 42 lies in the same plane as the pivot axis of pivot 38, however, the pivot axes extend in said plane in directions at right angle to one another.

A spring steel clamp bracket 48 is secured to disk 44 to extend upwardly therefrom in a direction away from disk 43, there being provided a clamp bolt 49 for securing the upper ends of the clamp legs of the clamp bracket in a position that the clamp legs will clampingly hold the motor housing of a motor 51 on the disk 44 in a fixed position relative thereto. A reenforcement member 47 is welded to disk 44 and to bracket 48. The motor shaft of motor 51 has a grinding wheel 52 keyed thereto. Surrounding the circumferential surface of the grinding wheel, other than of the lower part thereof, and in radial space relation to the circumferential surface of the grinding wheel is a grinding wheel guard 53. Guard 53 is mounted by being welded to a pair of bosses 54 which in turn are mounted on opposite end portions of the rod 55 and held in adjusted axial and angular positions relative thereto by set screws (not shown). An intermediate part of rod 55 is slidably extended through a boss 56 and retained in axial and angular adjusted positions relative thereto by a set screw 59. The boss 56 is welded to the upper end of bar 57 which is in turn retained on plate 32 in select angular positions relative thereto by a bolt 58 extended through apertures in the bar and plate and a nut (not shown) threaded on the bolt. When the last mentioned nut is loosened, the bar 57 may be pivoted about an axis that is parallel to the pivot axis of the pivot member 38 and parallel to the axis of elongation of rod 55.

A stop collar 61 is slidably mounted on the beam between the slide member 31 and one clamp collar 22, there being provided a set screw 62 that is threadably mounted by the collar for bearing against the beam to retain the collar in a selected adjusted position along the length of the beam. Similarly a collar 63 is mounted on the beam between the opposite end of the carriage 31 and the other clamp collar 22, collar 63 being retained in a selected adjusted position by set screw 64. Collar 63 mounts an upright 65 which in turn has a bolt 66 extended therethrough in a position to be abutable against plate 32. A lock nut 67 is threaded on bolt 66.

Slidably mounted on the beam between collar 63 and the adjacent clamp collar 22 is a slide collar 73, a set screw 74 being threaded through the slide collar retained it in selected adjusted positions along the length of the beam. An upright 75 is mounted on collar 73 for mounting a pivot 77 which in turn mounts the lower end of a lever 76; the pivot axis of pivot 77 being parallel to the pivot axis of pivot 38. The lever is provided with a plurality of space apertures 78 radially spaced from pivot member 77, one end of a bar 79 being mounted in the appropriate aperture 78 and the opposite end of the bar being pivotally connected to plate 32. As the result, upon pivoting the lever 76, the plate 32 and tubular member 31 are moved along the beam.

Also connected to the collar 73 is an upright 81 which in turn mounts a handle 82 to extend outwardly thereof. The handle and upright are provided for facilitating the placement of the apparatus of this invention on the saw blade and the removal thereof from said saw blade.

A spring 85 at one end is connected to a pin 86 that is mounted on the plate 32, and at is opposite end is secured to a pin 88 that is mounted in a fixed position relative the beam 21. The spring 85 resiliently urges the plate, and accordingly the member 31, in a direction away from the slide collar 73 (in the direction of arrow 91 toward stop collar 61).

In using the apparatus of this invention, the position of the slide collars 22 along the length of the beam are adjusted so that the washers 26 on each of the studs 25 supportingly bear against lower (radially inner) portions of angularly spaced tooth cut out of the saw blade that are angularly separated by a distance greater than the spacing of two adjacent teeth and then set screws 23 are tightened. Thereafter nuts 28 are tightened for clamping the saw blade between clamp legs 27, 24. During the time the positions of the collars 22 are being adjusted, the set screws for collars 61, 63 and 73 are in a loosened condition whereby the members could be freely slid along the length of the beam so that the grinding wheel 52 is out of the abutting relationship with a saw tooth. For the particular blade illustrated, there are three teeth between the blade recesses of the teeth in which the studs 25 are located.

Now, the positions of disk 35 relative to disk 34 and disk 44 relative disk 43 may be adjusted, if necessary, so that the axially extending surface of the grinding wheel is at the appropriate angles relative the bit to be sharpened, and the disks then clamped in fixed adjusted positions relative one another. Thence, the position of the stop collar 61 is adjusted along the length of the beam for limiting movement of the carriage in the direction of arrow 91 to a position the grinding wheel will not bear against the tooth of the blade that the surface of the tooth to be sharpened faces and at the same time permit the apparatus of this invention be lifted without striking the tooth to be sharpened when the apparatus is to be removed from the blade. Now, the spring 85 is mounted by members 86, 88 to resiliently retained the tubular member in abutting the relationship to collar 61, the spring previously having been disattached from at least one of members 86, 88.

With the motor stopped lever 76 is pivoted in the direction of arrow 92 to bring the flat surface of the grinding wheel into abutting relationship with the face 10c of the bit (tooth) 10b to be sharpened, and while being held in said position, the collar 63 is locked in a fixed position on the beam with the bolt 66 abutting against plate 32. Thereafter, the bolt 66 may be turned to a slightly backed off position to permit the desired degree of sharpening of the bit prior to the adjustment bolt 66 blocking further movement of the carriage in the direction opposite arrow 91 for sharpening the bit.

With the collars 61, 63 locked in their adjusted positions, the collar 73 is also locked in an adjusted position whereby when the lever 76 is pivoted in a direction of arrow 92 about pivot 77, the carriage is moved from a position that the tubular member 31 abuts against collar 61 to a position that plate 32 abuts against bolt 66. Thereafter, with the power turned on, the lever 76 is pivoted in the direction of arrow 92 for moving the grinding wheel 52 for sharpening the bit to be sharpened. Upon the bit being properly sharpened, the lever 76 is released and the spring 85 returns the carriage to a position abutting against collar 61. Now, the nuts on studs 25 are loosened, the apparatus of this invention lifted from the blade and thence clamped onto the blade in a position for sharpening the next bit on the blade. Normally, for any given blade, once the collars 22, 73, 63, 61 and 62 having been adjusted, they will not have to be readjusted. However, due to the provisions of the adjustable feature of each of the collars, the apparatus of this invention may be readily used for sharpening blades of different diameters and/or substantially different circumferential spacing of adjacent bits on the blade.

To be mentioned, when the apparatus of this invention is clamped on a saw blade, the carriage and studs 36 are spaced from the saw blade, the thickness of the wall of the tubular member 31 adjacent the saw blade being less than the thickness of the sides of the collars 22 that abut against the saw blade. As a result, the saw blade does not interfer with the movement of the carriage on the beam.

Also to be mentioned is that the left hand collar of FIG. 1 and collar 73 could be integrally joined; however, by making them separate, greater adjustability is obtained.

What is claimed is:

1. In a saw sharpner mountable on a saw blade having a span of saw teeth, an elongated beam having first and second ene portions, first and second clamps means mounted on the beam first and second end portions respectively for clampingly mounting the beam on a saw blade to be supported thereby, a carriage mounted on the beam for reciprocal movement between the clamp means, lever means mounted on the beam for selectively moving the carriage relative the beam and means mounted on the carriage for movement therewith for mounting a motor driven grinding wheel, the last mentioned means including a motor mount, and adjustable means mounting the motor mount on the carriage for movement relative thereto between various angular positions and retaining the mount in a selected angular position.

2. The apparatus of claim 1 further characterized in that the adjustable means includes means for mounting the motor mount for limited pivotally movement about a first pivot axis and selectively retaining the motor mount in an adjusted pivoted position relative thereto, and means mounted the pivot means on the carriage for limited pivotally movement about a second axis that is about at right angles to the first pivot axis and the directions of reciprocal movement of the carriage on the beam.

3. The apparatus of claim 2 further characterized in that is provided a grinding wheel guard and means for mounting the guard on the carriage for limited adjustable movement relative the carriage.

4. The apparatus of claim 1 further characterized in that each of the clamp means includes a clamp collar mounted on the beam for slidable movement along the length thereof and means for locking the collar in various selected adjusted positions on the beam.

5. The apparatus of claim 4 further characterized in that the lever means includes a lever collar mounted on the beam between the first clamp means and carriage for slidable movement, means for locking the lever collar to the beam in a selected slidable position relative to the beam, a lever pivotally mounted on the lever collar and a linkage for connecting the lever to the carriage for moving the carriage as the lever is pivoted.

6. The apparatus of claim 5 further characterized in that there is provide spring means connected to the carriage for resiliently urging the carriage away from the lever collar and moving the carriage away from the collar and adjustable stop means on the beam for limiting the slidably movement of the carriage on the beam in each direction of reciprocal movement thereon.

7. A saw sharpner mountable on a disk saw having circumferentically spaced teeth around the peripheral portion thereof, comprising an elongated beam of a length substantially greater than the linear spacing of at least three teeth and having a first end portion and a second end portion, first and second lamp means mounted on the beam first and second end portions respectively for clampingly mounting the beam on the saw, a carriage mounted on the beam for reciprocal movement between the clamp means, lever means mounted on the beam for selectively reciprocally moving the carriage relative the beam, a motor, a grinding wheel drivenly mounted by the motor, a motor mount mounting the motor, and adjustable means mounting the motor mount on the carriage to permit adjusting the motor mount for varying the angle and pitch of the grinding wheel relative the saw tooth to be sharpened.

8. The apparatus of claim 7 further characterized in that the first clamp means includes a clamp collar, a first clamp leg dependingly joined to the clamp collar, a second clamp leg, a stud secured to the collar for removably mounting the second leg, means mountable on the stud between the collar and second leg for spacing the second leg from the collar and that is adapted to seat on the peripheral edge of a tooth recess and means for releasably retaining the second leg on the stud in a saw clamping position relative the first leg.

9. The apparatus of claim 8 further characterized in that the collar is mounted on the beam for lengthwise slidable movement relative thereto and that the first means includes means for releasably retaining the collar in selected adjustable slidably positions relative to the beam.

10. The apparatus of claim 7 further characterized in that the lever means includes a lever, means for releasably retaining the lever in various select adjusted positions along the length of the beam, including mounting the lever for pivotal movement, and linkage means connecting the lever to the carriage for moving the carriage as the lever is pivoted.

11. The apparatus of claim 10 further characterized in that there is provided resilient means acting against the carriage for moving the carriage away from the lever retaining means.

12. The apparatus of claim 10 further characterized in that at least one of the clamp means includes a clamp mounting member mounted on the beam for slidable movement toward and away from the carriage, and means for lockingly retaining the clamp mounting member in a given position on the beam.

13. The apparatus of claim 10 further characterized in that there is provided a grinding wheel guard and means for mounting the guard on the carriage for limited adjustable movement relative the wheel and selectively retaining the guard in an adjusted position.

14. The apparatus of claim 10 further characterized in that the beam is polygonal in cross section, that the carriage includes a tubular member on the beam that has a polygonal inner peripheral section forming a close sliding fit with the beam, and a plate joined to the tubular member to extend thereabove, and that the adjustable means for mounting the motor mount includes, a first disk mounted on the plate in fixed angular relationship thereto and having a central axis extending perpendicular to the direction of elongation of the beam, a second disk mounted on the first disk for pivotal movement about the first disk central axis, means for releasably securing the first and second disks together in various selected adjusted angular positions relative one another, a third disk pivotally attached to the motor mount, means for releasably securing the motor mount to the third disk in various selected adjusted angular positions relative the motor mount, said first and third disks having peripheral edge portions in at least nearly tangential relationship to one another, and means for fixedly securing the third disk to the first disk to extend at about right angles relative thereto.

15. In a saw sharpner mountable on a circular saw blade having circumferentially spaced teeth, a longitudinally elongated beam having first and second end portions, first and second clamp means mounted on the beam longitudinally spaced from one another for clampingly mounting the beam on the saw blade, a carriage mounted on the beam for longitudinal slidably movement between a tooth grinding position and a position longitudinally spaced therefrom, means mounted on the carriage for movement therewith for mounting a motor driven grinding wheel, and manually operated means mounted on one of beam and one of the clamp means and connected to the carriage for moving said carriage between said positions.

* * * * *

UNITED STATES PATENT OFFICE
CERTIFICATE OF CORRECTION

PATENT NO. : 3,880,019
DATED : April 29, 1975
INVENTOR(S) : Melburne E. Young

It is certified that error appears in the above-identified patent and that said Letters Patent are hereby corrected as shown below:

Column 5, line 37, "mounted" should be --mounting--.
Column 6, line 4, "lamp" should be --clamp--.

Signed and sealed this 15th day of July 1975.

(SEAL)
Attest:

RUTH C. MASON
Attesting Officer

C. MARSHALL DANN
Commissioner of Patents
and Trademarks